(12) United States Patent
Mattox et al.

(10) Patent No.: US 10,625,194 B1
(45) Date of Patent: Apr. 21, 2020

(54) FILTER CARTRIDGES WITH TUBULAR FILTER MEMBERS

(71) Applicant: Schenck Process LLC, Kansas City, MO (US)

(72) Inventors: Daniel Mattox, Kansas City, MO (US); Blake Meyer, Kansas City, MO (US)

(73) Assignee: Schenck Process LLC, Kansas City, MO (US)

( * ) Notice: Subject to any disclaimer, the term of this patent is extended or adjusted under 35 U.S.C. 154(b) by 0 days.

(21) Appl. No.: 16/235,397

(22) Filed: Dec. 28, 2018

(51) Int. Cl.
*B01D 53/02* (2006.01)
*B01D 46/24* (2006.01)
*B01D 46/42* (2006.01)
*B01D 46/00* (2006.01)

(52) U.S. Cl.
CPC ........ *B01D 46/2411* (2013.01); *B01D 46/002* (2013.01); *B01D 46/4281* (2013.01)

(58) Field of Classification Search
CPC .............. B01D 46/2411; B01D 46/002; B01D 46/4281
See application file for complete search history.

(56) References Cited

U.S. PATENT DOCUMENTS

| | | | | |
|---|---|---|---|---|
| 3,395,519 A | * | 8/1968 | Kleissler | B01D 46/0075 55/304 |
| 3,630,005 A | * | 12/1971 | Reinauer | B01D 46/0068 55/302 |
| 3,680,285 A | * | 8/1972 | Wellan | B01D 46/0004 285/136.1 |
| 4,082,523 A | * | 4/1978 | Pausch | B01D 46/0075 55/293 |
| 4,357,151 A | * | 11/1982 | Helfritch | B03C 3/80 55/302 |
| 4,478,618 A | * | 10/1984 | Bly | B01D 46/0005 210/323.2 |
| 4,521,231 A | * | 6/1985 | Shilling | B01D 46/04 55/302 |
| 4,735,635 A | * | 4/1988 | Israelson | B01D 46/0068 55/302 |
| 5,030,261 A | * | 7/1991 | Giusti | B01D 46/002 55/326 |
| 5,944,859 A | * | 8/1999 | Lippert | B01D 46/002 55/302 |
| 8,157,878 B2 | | 4/2012 | Weber et al. | |
| 9,126,132 B2 | | 9/2015 | Raether | |
| 2005/0178097 A1 | | 8/2005 | Clements | |
| 2008/0120949 A1 | | 5/2008 | Welch et al. | |
| 2008/0271607 A1 | * | 11/2008 | Mahon | B01D 46/0068 96/421 |
| 2009/0045149 A1 | | 2/2009 | Murray et al. | |

(Continued)

*Primary Examiner* — Christopher P Jones
(74) *Attorney, Agent, or Firm* — Hovey Williams LLP

(57) ABSTRACT

A filter cartridge for dust collection systems is provided that comprises a plurality of tubular filter members. More particularly, the filter cartridges comprise: (a) a first support structure comprising a plurality of apertures; (b) a second support structure; and (c) a plurality of tubular-shaped filter members disposed between the first support structure and the second support structure. The apertures within the first support structure are designed to enhance the Venturi effect within the tubular-shaped members, thereby forming a filter cartridge that may operate at lower pressure drops and flow velocities.

20 Claims, 11 Drawing Sheets

(56) References Cited

U.S. PATENT DOCUMENTS

2009/0188389 A1* 7/2009 Dacosta ............... B01D 39/06
                                                              95/285
2010/0018173 A1* 1/2010 Park .................... B01D 46/0013
                                                              55/323

* cited by examiner

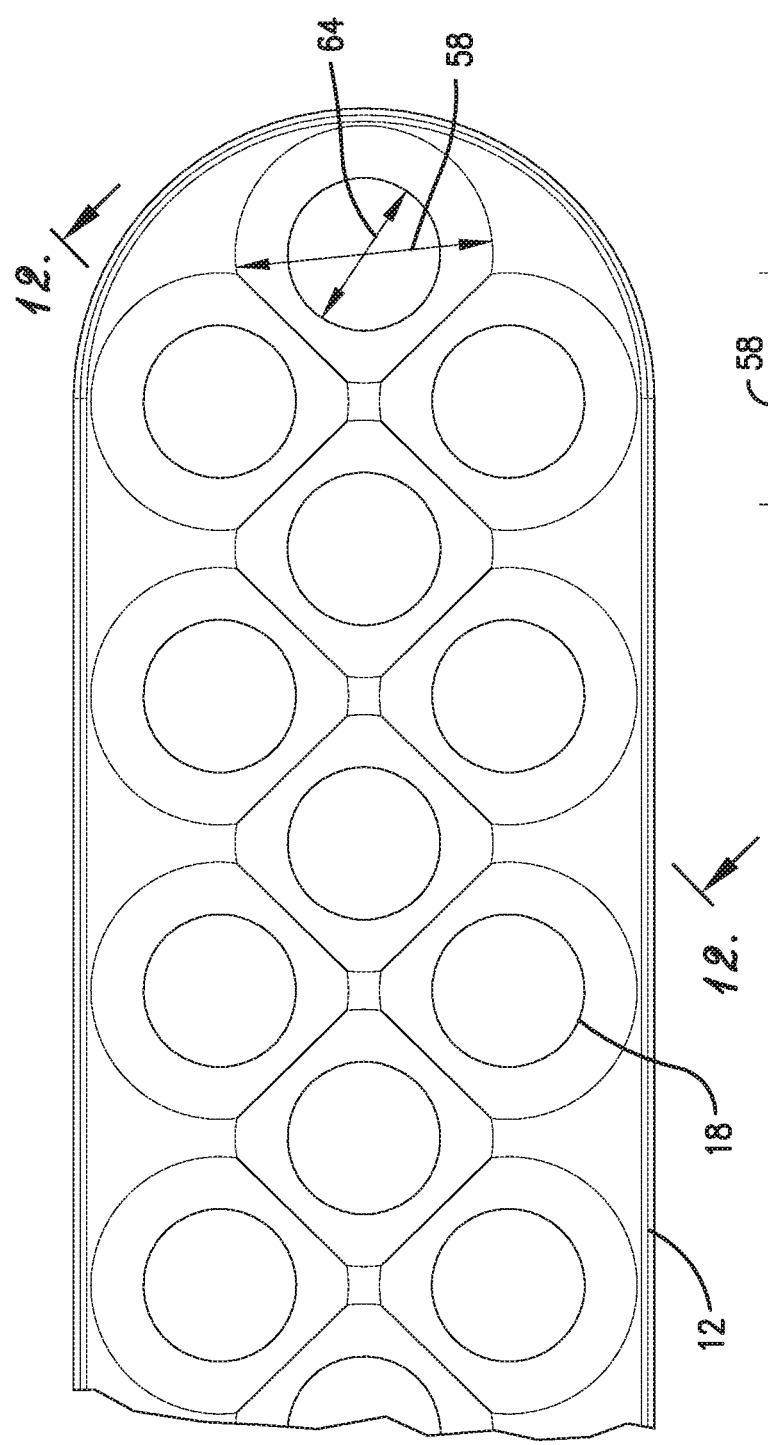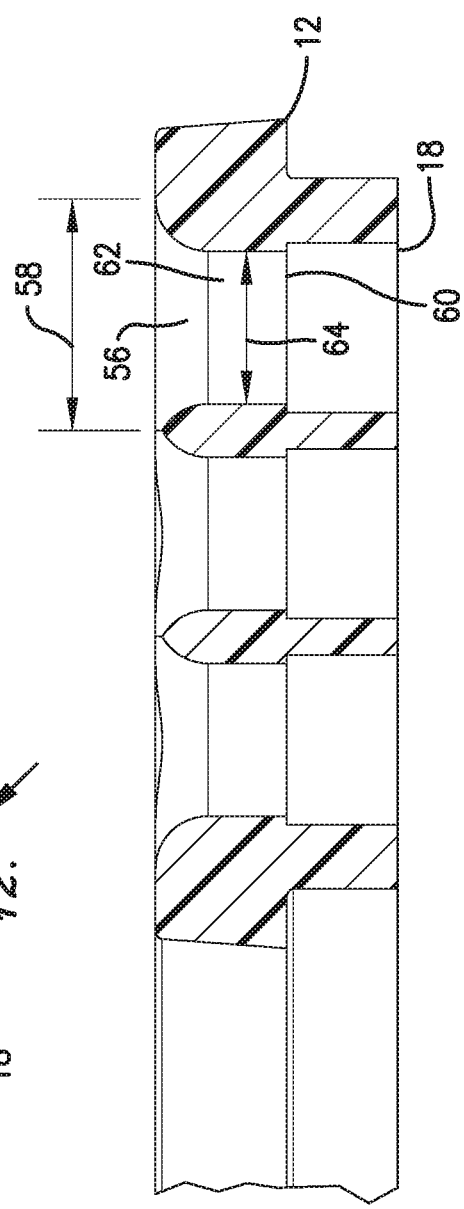

FILTER CARTRIDGES WITH TUBULAR FILTER MEMBERS

BACKGROUND

1. Field of the Invention

The present invention is generally directed to a filter cartridge for use in a dust collection system. More particularly, the present invention is generally directed to a filter cartridge for dust collection systems that comprises a plurality of tubular filter members.

2. Description of the Related Art

Dust collection systems for filtering and collecting dust, dirt, and other fine particulates from a particulate-laden air stream commonly include air filters, such as air filter cartridges, for filtering the dust from the clean air. Typically, the cartridges are mounted in a plate, commonly referred to as a tube sheet or a cell plate, that separates the dust collector into a lower, dirty air chamber and an upper, clean air chamber. In many cases, the tube sheet has a number of openings through which cylindrical filters, such as bags or cartridges, typically extend into the dirty air chamber. The air passes through the filters and through the openings in the tube sheet into the clean air chamber. The particulates are separated from the air flow by the filters and the filtered air is usually exhausted from the clean air chamber. The air filter cartridges generally include filter media that tends to accumulate at least a portion of the separated dust. To maintain an efficient filtering system, the dust accumulated on the filter media may be at least partially removed, especially if the dust collects in a relatively thick layer, via a pulsed air system.

Although advances have been made in regard to filter cartridges for dust collection systems, further improvements are still being sought in order to enhance filtering performances.

SUMMARY

One or more embodiments of the present invention generally concern a filter cartridge for a dust collection system. Generally, the filter cartridge comprises: (a) a first support structure comprising a plurality of apertures; (b) a second support structure; and (c) a plurality of tubular-shaped filter members disposed between the first support structure and the second support structure, wherein the tubular-shaped filter members are in fluid communication with the apertures.

One or more embodiments of the present invention generally concern a dust collection system. Generally, the dust collection system comprises: (a) a housing comprising at least one sidewall; (b) a tube sheet mounted within the housing and comprising one or more receptacles; and (c) at least one filter cartridge at least partially positioned in the receptacles and that extends horizontally towards the sidewall. Furthermore, the filter cartridge comprises: (i) a first support structure comprising a plurality of apertures; (ii) a second support structure; and (iii) a plurality of tubular-shaped filter members disposed between the first support structure and the second support structure, wherein the tubular-shaped filter members are in fluid communication with the apertures.

One or more embodiments of the present invention generally concern a method for filtering gas. Generally, the method comprises: (a) introducing a gas stream comprising particulates into a dust collection system; (b) passing the gas stream through a filter cartridge positioned within the dust collection system to remove at least a portion of the particulates from the gas stream and thereby form a filtered gas stream; and (c) removing the filtered gas stream from the dust collection system. Furthermore, the filter cartridge comprises: (i) a first support structure comprising a plurality of apertures; (ii) a second support structure; and (iii) a plurality of tubular-shaped filter members disposed between the first support structure and the second support structure, wherein the tubular-shaped filter members are in fluid communication with the apertures.

BRIEF DESCRIPTION OF THE FIGURES

Embodiments of the present invention are described herein with reference to the following drawing figures, wherein:

FIG. 11 is a fragmented view of the apertures in a support plate of the filter cartridge according to an embodiment of the present invention; and FIG. 12 is a cross-sectional view of the apertures taken along line 12-12 of FIG. 11.

DETAILED DESCRIPTION

The present invention is generally directed to a filter cartridge for use in a dust collection system. More particularly, the present invention is generally directed to a filter cartridge for dust collection systems that comprise a plurality of tubular filter members.

In the following description of illustrative embodiments, reference is made to the accompanying figures which depict, by way of illustration, specific embodiments. It is to be understood that other embodiments may be utilized and structural changes may be made without departing from the scope of the present invention.

Figure 5:
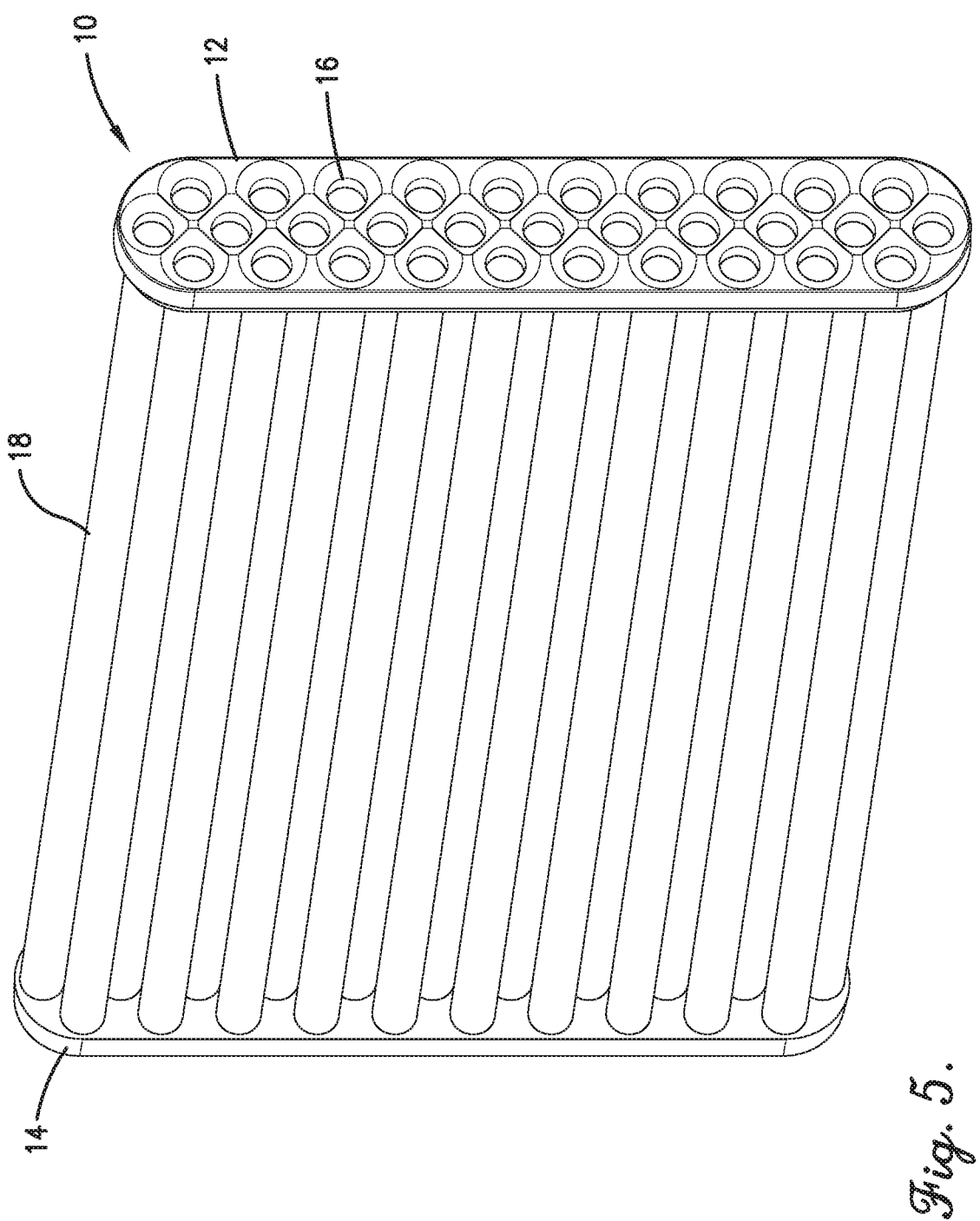
FIG. 5 is a side view of the filter cartridge according to an embodiment of the present invention.
Figure 6:
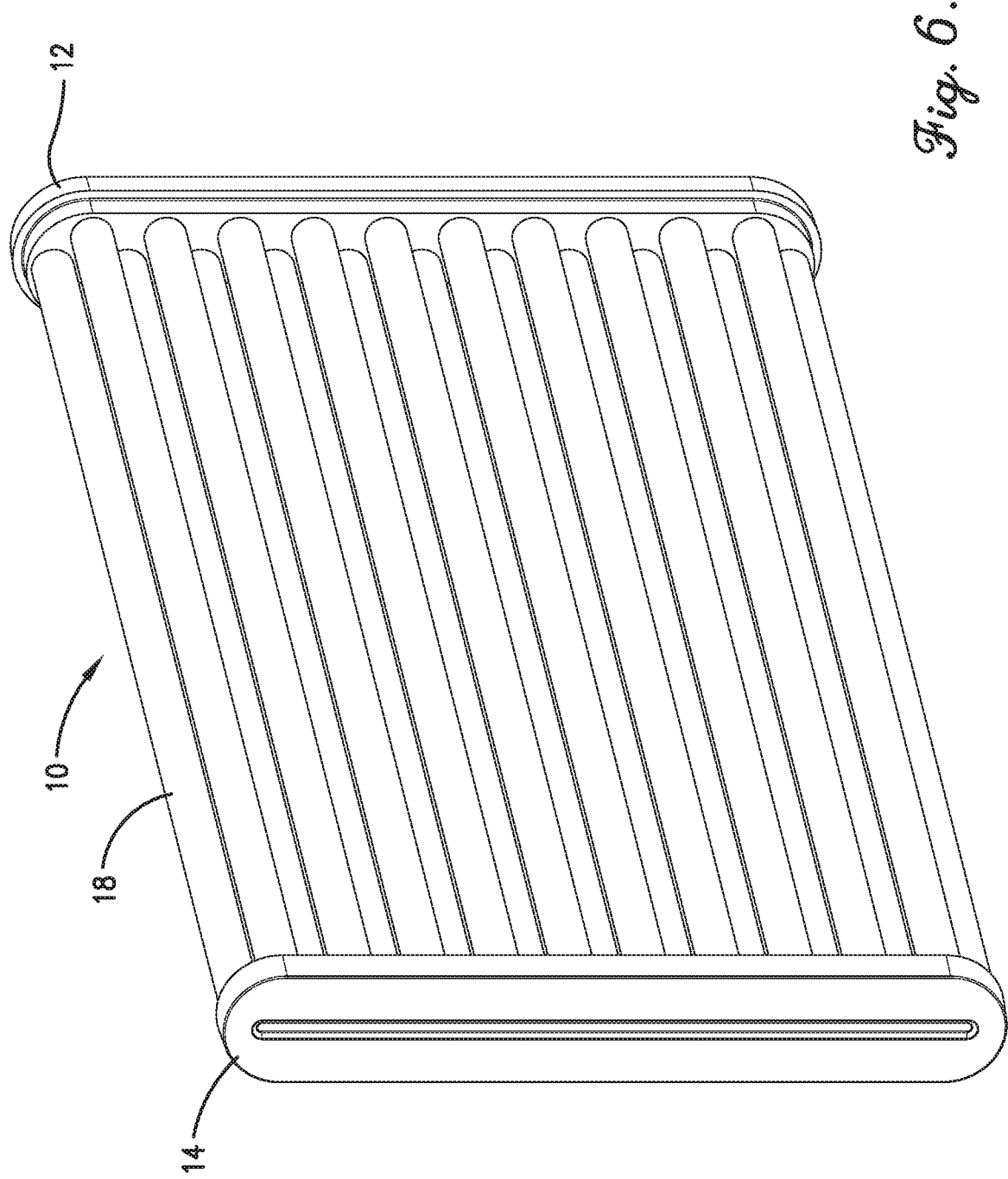
FIG. 6 is a side view of the filter cartridge according to an embodiment of the present invention.

As depicted in FIGS. 5 and 6, the present invention is generally directed to the use of a filter cartridge 10 comprising: (i) a first support structure 12 comprising a plurality of apertures 16, (ii) a second support structure 14, and (iii) a plurality of tubular-shaped filter members 18 disposed between the first support structure 12 and the second support structure 14. As shown in FIG. 5, the tubular-shaped filter members 18 are connected with the apertures 16. Thus, in such embodiments, the interior passages of the filter members 18 are in fluid communication with the apertures. As discussed below in greater detail, the apertures 16 of the filter cartridge 10 comprise constricted sections that enhance the Venturi effect within the filter cartridge 10. This resulting configuration may enhance the movement of fluids, such as a gas, from a dirty air chamber to a clear air chamber by taking advantage of the Venturi effect created by this unique aperture configuration. Consequently, due to this enhanced Venturi effect, the aperture 16 configuration of the present invention can allow dust containment systems to operate at lower pressure drops and flow velocities compared to other filter cartridges used in the industry.

Turning again to FIGS. 5 and 6, the first support structure 12 and the second support structure 14 of the filter cartridge 10 can be formed of steel, aluminum, or any other material suitable for supporting the filter cartridge and the tubular-shaped filter members 18 disposed therein. Generally, the first support structure 12 and the second support structure 14 may be in the form of end plates that are designed to hold the filter cartridge 10 together and optimally position the tubular-shaped filter members 18.

In various embodiments, the first support structure 12 and the second support structure 14 may comprise any longitudinal shape depending on the desired shape of the filter cartridge 10 and the dust collection system it is being utilized in. For example, the first support structure 12 and the second support structure 14 may comprise a longitudinal shape that has a defined shape, such as a circular shape, a rectangular shape, a square shape, or a triangular shape, or a non-conventional shape, such as a non-circular shape. In certain embodiments, the first support structure 12 and the second support structure 14 may comprise a longitudinal shape that has a non-circular shape. For instance, as depicted in FIGS. 5 and 6, the first support structure 12 and the second support structure 14 may comprise a longitudinal shape defined by a rectangular shape with a pair of semicircles positioned at opposites sides. The longitudinal shapes of the first support structure 12 and the second support structure 14 can help deter undesirable buildup of dust and other contaminants on the filter cartridge 10 due to the absence of nooks, crevices, recesses, or sharp corners. The absence of these features on the first support structure 12 and the second support structure 14 can prevent dust and other particulates from forming on the structures.

As shown in FIG. 5, the first support structure 12 may comprise a plurality of apertures 16, wherein each aperture 16 may be connected to a tubular-shaped filter member 18. In one or more embodiments, the filter cartridge 10 may comprise a ratio of tubular-shaped filter members 18 to apertures 16 of 1:1. In various embodiments, the first support structure 12 may comprise at least 2, 3, 4, 5, 10, 15, 20, 25, or 30 and/or less than 500, 450, 400, 350, 300, 250, 200, 150, 100, or 50 apertures 16.

Furthermore, in various embodiments, the apertures 16 may be in a staggered configuration on the first support structure 12 so as to optimize the filtration effectiveness of the filter cartridge 10. As shown in FIG. 5, the first support structure 12 may comprise three vertical columns of apertures 16 that are staggered so as to maximize filtration surface area. In such embodiments, the staggered configuration may comprise two vertical columns in parallel with each other and a third vertical column offset from the first and second columns. In other embodiments, the first support structure 12 may comprise a staggered aperture configuration comprising at least 2, 3, 4, 5, or 6 vertical columns of apertures, with each column comprising at least 2, 3, 4, 5, 6, 7, or 8 apertures.

As shown in FIG. 6, the second support structure 14 has a recess that facilitates the horizontal insertion of the filter cartridge 10 into the dust collection system (as discussed below). Although not depicted, the second support structure 14 also contains connection points where each of the tubular-shaped filter members 18 are connected to the second support structure 14; however, these connection points (e.g., recesses configured to fit the ends of the tubular-shaped filter members 18) are closed-off and concealed by the second support structure 14. The second support structure 14 is designed to add rigidity and strength to the filter cartridge 10.

The filter cartridge 10 may comprise a plurality of the tubular-shaped filter members 18. For instance, the filter cartridge 10 may comprise at least 2, 3, 4, 5, 10, 15, 20, 25, or 30 and/or less than 500, 450, 400, 350, 300, 250, 200, 150, 100, or 50 tubular-shaped filter members 18. In one or more embodiments, each of the tubular-shaped filter members 18 have an average diameter of at least 0.2, 0.3, 0.4, 0.5, 0.6, 0.7, 0.8, or 0.9 inches and/or less than 4, 3, 2.5, 2, 1.9, 1.8, 1.7, 1.6, 1.5, 1.4, 1.3, 1.2, 1.1, or 1 inches.

The tubular-shaped filter members 18 may be formed from any conventional filter media known in art including, for example, nonwoven filter media or spunbond filter media. In various embodiments, the tubular-shaped filter members 18 may be formed from a synthetic filter media comprising fibers formed from polypropylene, polyester, polyamides, copoylesters, PPS, or combinations thereof. Additionally or alternatively, the tubular-shaped filter members 18 may be formed from a cellulose-containing filter media. In one or more embodiments, the tubular-shaped filter members 18 are formed from a filter media comprising at least 50, 60, 75, 85, or 95 weight percent of cellulose fibers and/or glass fibers. In certain embodiments, the tubular-shaped filter members may comprise cellulose-containing fibers and synthetic fibers.

In various embodiments, the tubular-shaped filter members 18 may be formed from a filter media comprising a basis weight of at least 1, 5, or 10 gsm and/or less than 500, 400, 300, 200, or 100 gsm.

Figure 1:
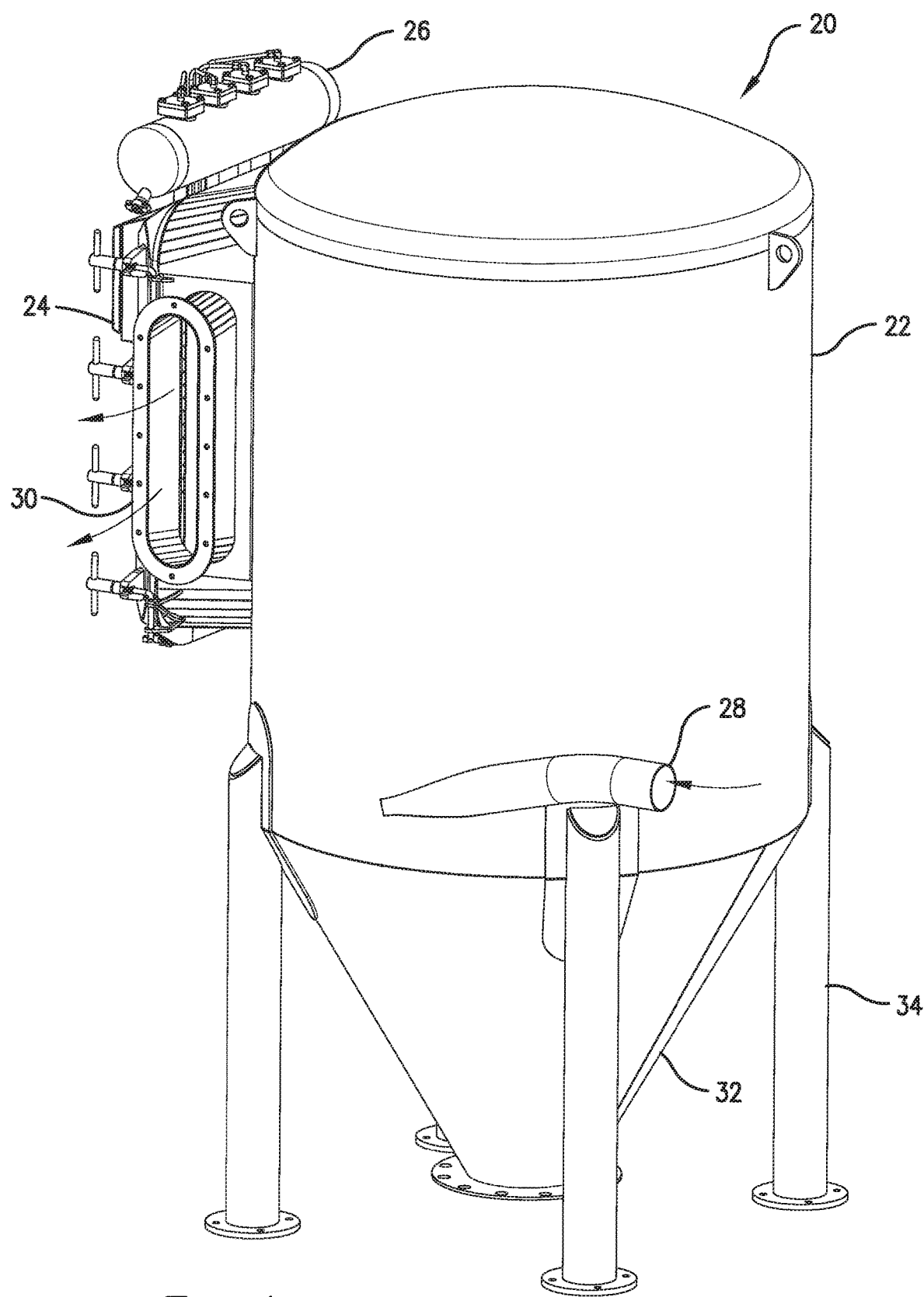
FIG. 1 is a side elevation view of the dust collection system according to an embodiment of the present invention.
Figure 2:
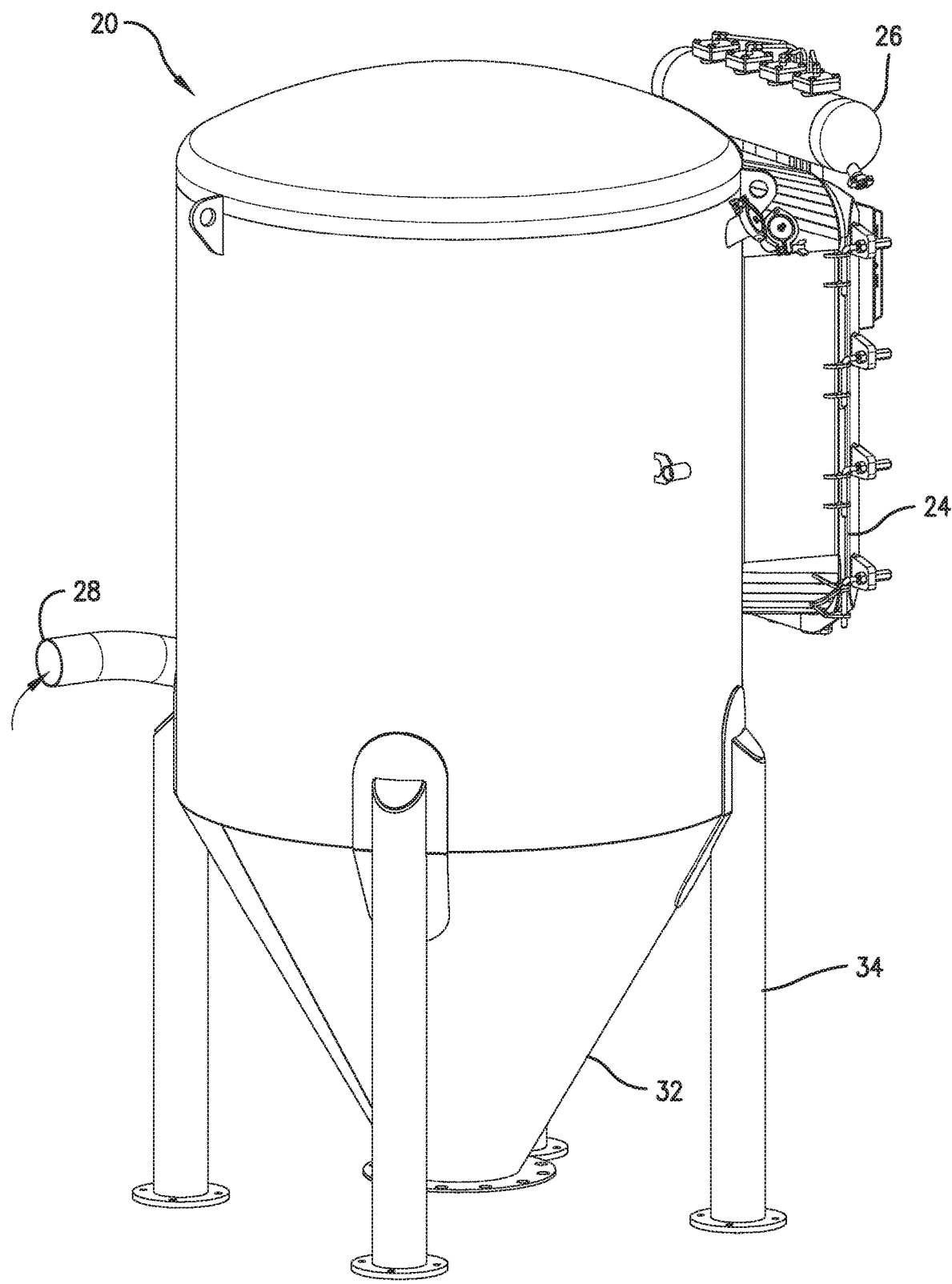
FIG. 2 is a side elevation view of the dust collection system according to an embodiment of the present invention.

Turning now to FIGS. 1 and 2, an exemplary dust collection system 20 is depicted. As shown in FIGS. 1 and 2, the dust collection system 20 comprises a housing 22, a housing access door 24, a pulsed air system 26 for at least partially cleaning the filter cartridges disposed in the system 20, a dirty fluid inlet 28 that allows a dirty fluid stream (e.g., an air stream comprising particulates) to flow into the housing 22, a clean fluid outlet 30 that allows the cleaned fluid (e.g., a filtered air stream) to escape the system 20, and a hopper 34 extending from the housing 22 to collect dust.

As shown in FIGS. 1 and 2, the dust collection system 20 is operable to receive air laden with dust, dirt, and other small and fine particulates in the housing 22. The housing 22 of the system 20 may be mounted on legs 34. The size of the housing 22 will vary depending on a desired size of the dust collection system 20. However, in various embodiments, the housing 22 may be approximately 2 to 10 feet in width, approximately 3 to 30 feet in length, and approximately 3 to 20 feet in height. Generally, the housing 22 is formed of steel, aluminum, or other material suitable for receiving and retaining pressurized air therein.

Referring once again to FIGS. 1 and 2, the hopper 32 extends from the housing 22. The hopper 32 is configured to receive dust filtered from the air inputted into the housing 22. The hopper 32 can be any shape operable to collect the dust, and in various embodiments, the hopper 32 is generally pyramidal in shape.

As illustrated in FIGS. 1 and 2, the housing 22 may include a housing access door 24 configured to seal the housing 22 and substantially prevent air from escaping the housing 22 during operation of the dust collection system 20. The housing access door 24 is pivotable about an elongated hinge for ease of access to the air filter cartridges 10 housed within the housing 22.

Figure 3:
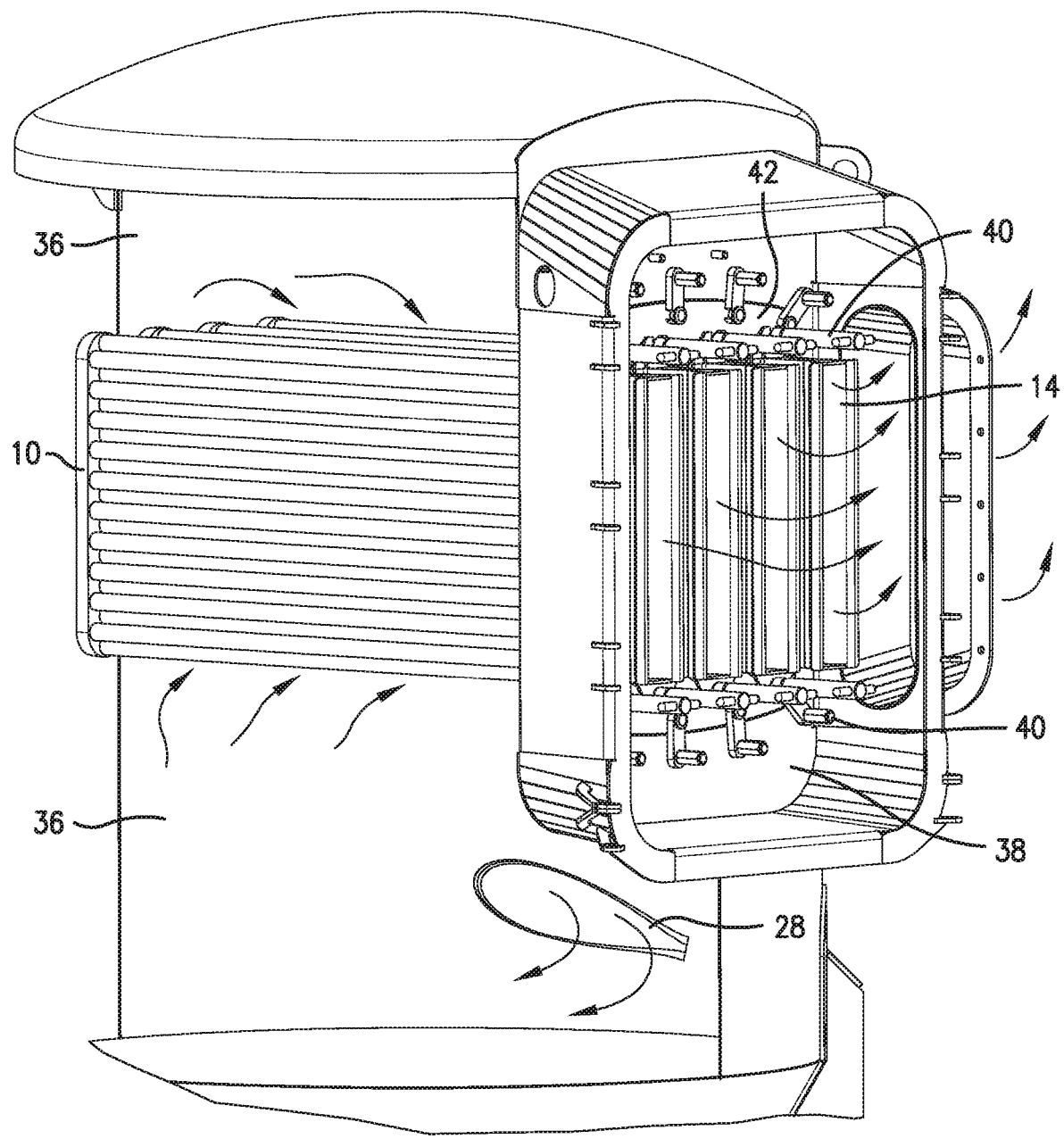
FIG. 3 is a partially fragmented isometric view of the inside of the dust collection system that depicts the filter cartridges positioned within the tube sheet according to an embodiment of the present invention.

Turning to FIGS. 3, 4, and 7-10, the housing 22 is generally divided into the dirty air chamber 36 and the clean air chamber 38 by the tube sheet 42. Referring to FIG. 3, a particulate-laden air stream is provided to the dirty air chamber 36 via the air inlet 28, which passes upwards through the housing 22 and travels through the air filter cartridges 10. After traveling through the tubular-shaped filter members in the filter cartridges 10, the filtered air stream exits the clean air chamber 38 of the housing 22 via the outlet 30. Ducts (not shown) are secured to the inlet 28 and the outlet 30 for transporting the dirty and clean air, respectively.

Figure 4:
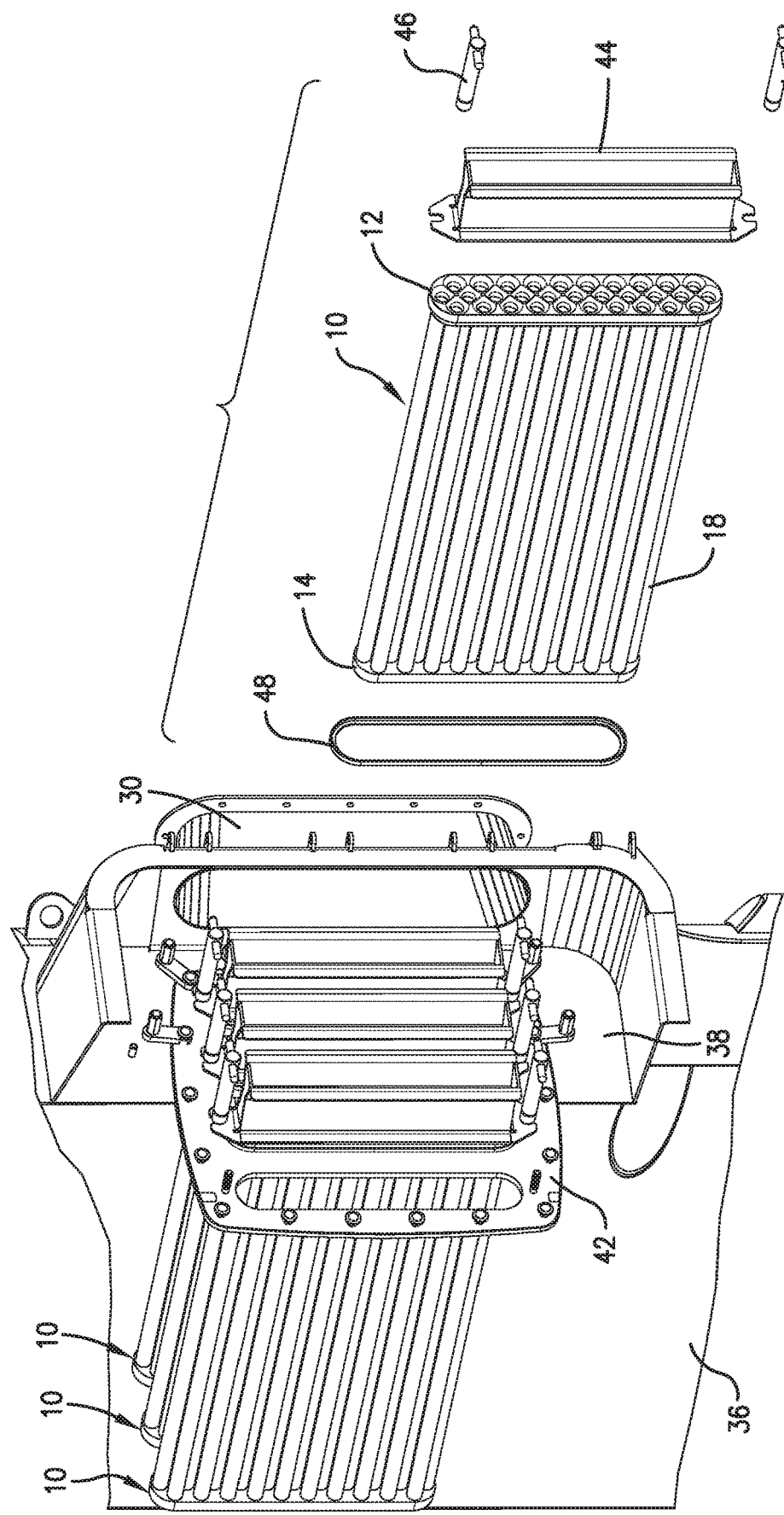
FIG. 4 is a partially fragmented isometric view of the inside of the dust collection system that depicts the filter cartridges positioned within the tube sheet according to an embodiment of the present invention.

As shown in FIGS. 3 and 4, a tube sheet 42 is mounted within the housing 22 and generally divides the housing 22 into the dirty air chamber 36 and the clean air chamber 38. The tube sheet 42, also known in the art as cell plate, may be formed of steel, aluminum, or other suitably rigid materials. In various embodiments, the tube sheet 42 includes at least one receptacle 50, and preferably a plurality of receptacles 50, comprising an opening through the tube sheet 42 for receipt of the air filter cartridge 10, as illustrated in FIGS. 3, 4, and 7-10.

Furthermore, the system 20 also comprises at least one air filter cartridge 10 configured to be removably mounted in the tube sheet 42. The dust is filtered from the air by passing through the air filter cartridges 10. Generally, the filter cartridges 10 and the system 20 of the present invention are able to remove at least 50, 60, 70, 80, 85, 90, 95, 96, 97, 98, or 99 percent by weight of the particulates originally present in the dirty air stream introduced into the system 20.

The filter cartridges 10 are periodically at least partially cleaned of particulates via the pulsed air system 26. An exemplary pulsed air system is depicted in U.S. Pat. No. 8,157,878, the disclosure of which is incorporated herein by reference in its entirety. As the filter elements capture particulate matter, flow through the system 20 is inhibited and periodic cleaning of the filter elements can be performed to increase air flow through the system 20. Cleaning can be accomplished by periodically pulsing a brief jet of pressurized air into the interior of the filter element to reverse the air flow through the filter element, causing the collected particulate matter to be driven off of the filter element.

As illustrated in FIGS. 3, 4, 7, and 8, each filter cartridge 10 is secured within the tube sheet 42 via a cartridge retainer 40. As shown in FIG. 4, each cartridge retainer 40 is configured to be easily removed for replacement of the cartridge 10. The cartridge retainer 40 broadly comprises a retainer body 44 and a securement mechanism 46 for removably securing the retainer body 44 to the tube sheet 42. The retainer body 44 is sized to substantially surround the outer perimeter of the filter cartridge 10, as illustrated in FIG. 4. Additionally, a gasket 48 is provided to help position and support the filter cartridge 10 within the tube sheet 42 and housing 22.

In various embodiments of the present invention, the air filter cartridges 10 comprise a general shape that is substantially the same as the receptacle 50 formed in the tube sheet 42 so that the cartridge 10 slides therethrough in a relatively close fit.

Figure 7:
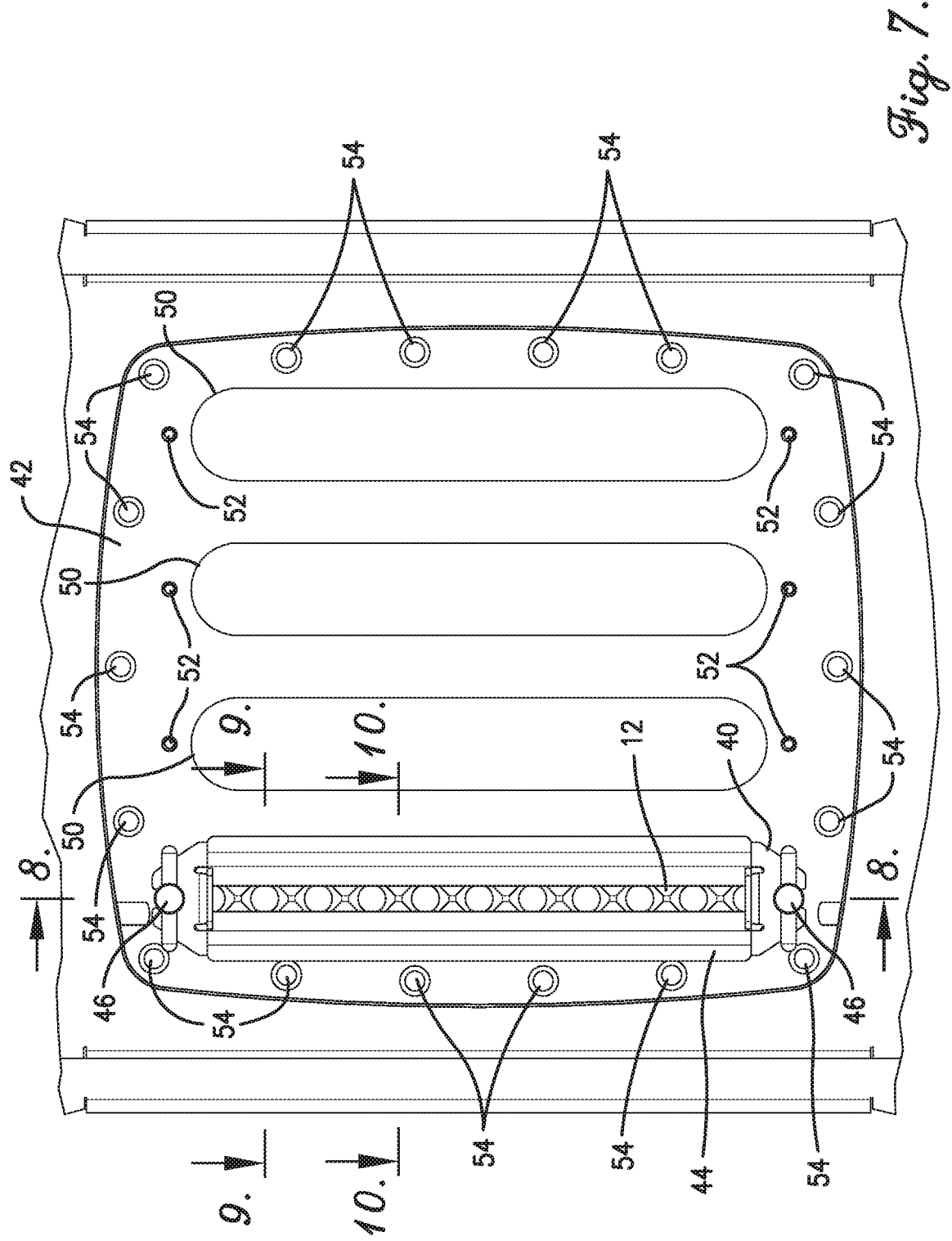
FIG. 7 is a front view of the tube sheet with a filter cartridge positioned therein according to an embodiment of the present invention.
Figure 8:
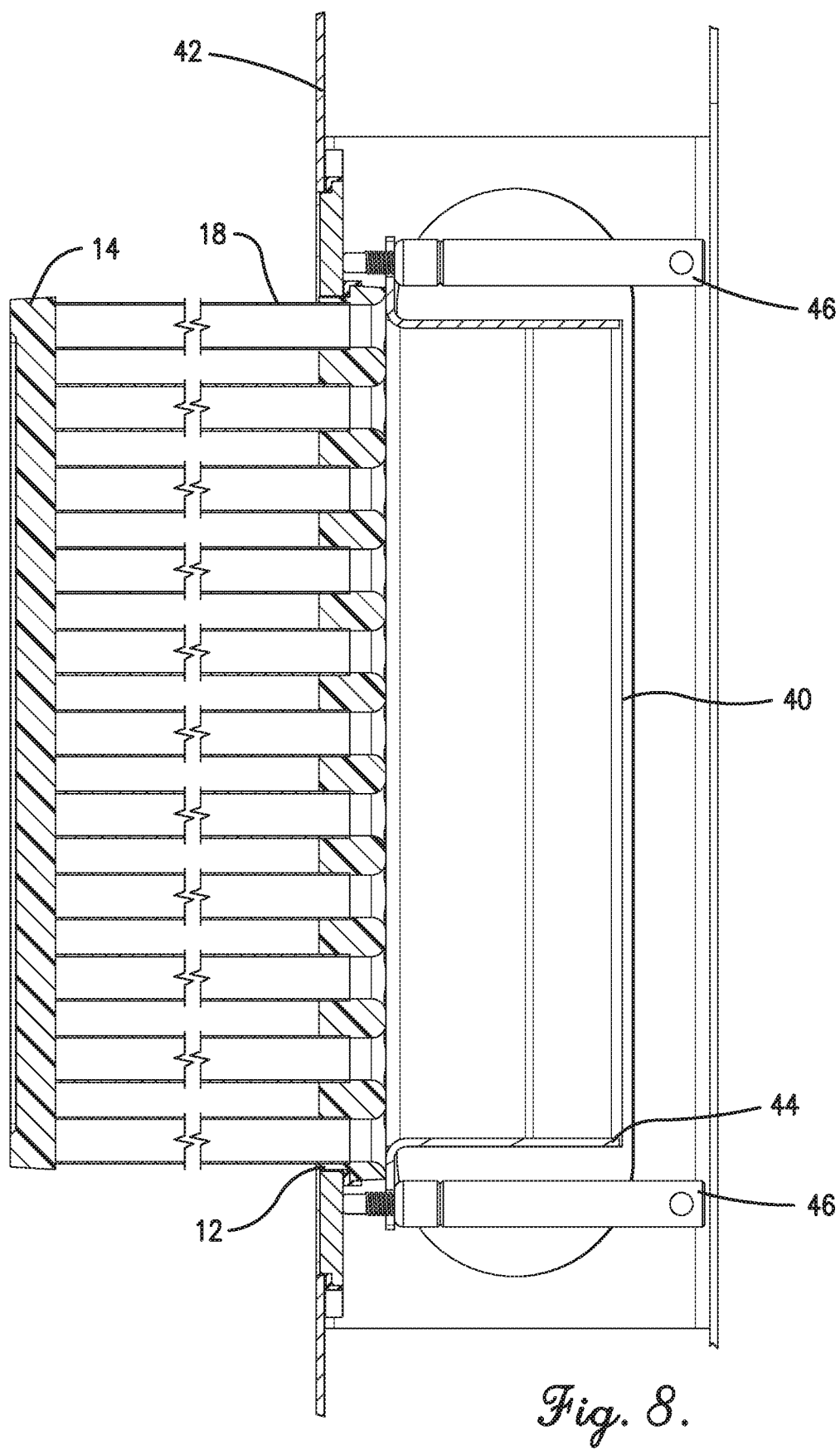
FIG. 8 is a cross-sectional view of the tube sheet and filter cartridge taken along line 8-8 of FIG. 7.
Figure 9:
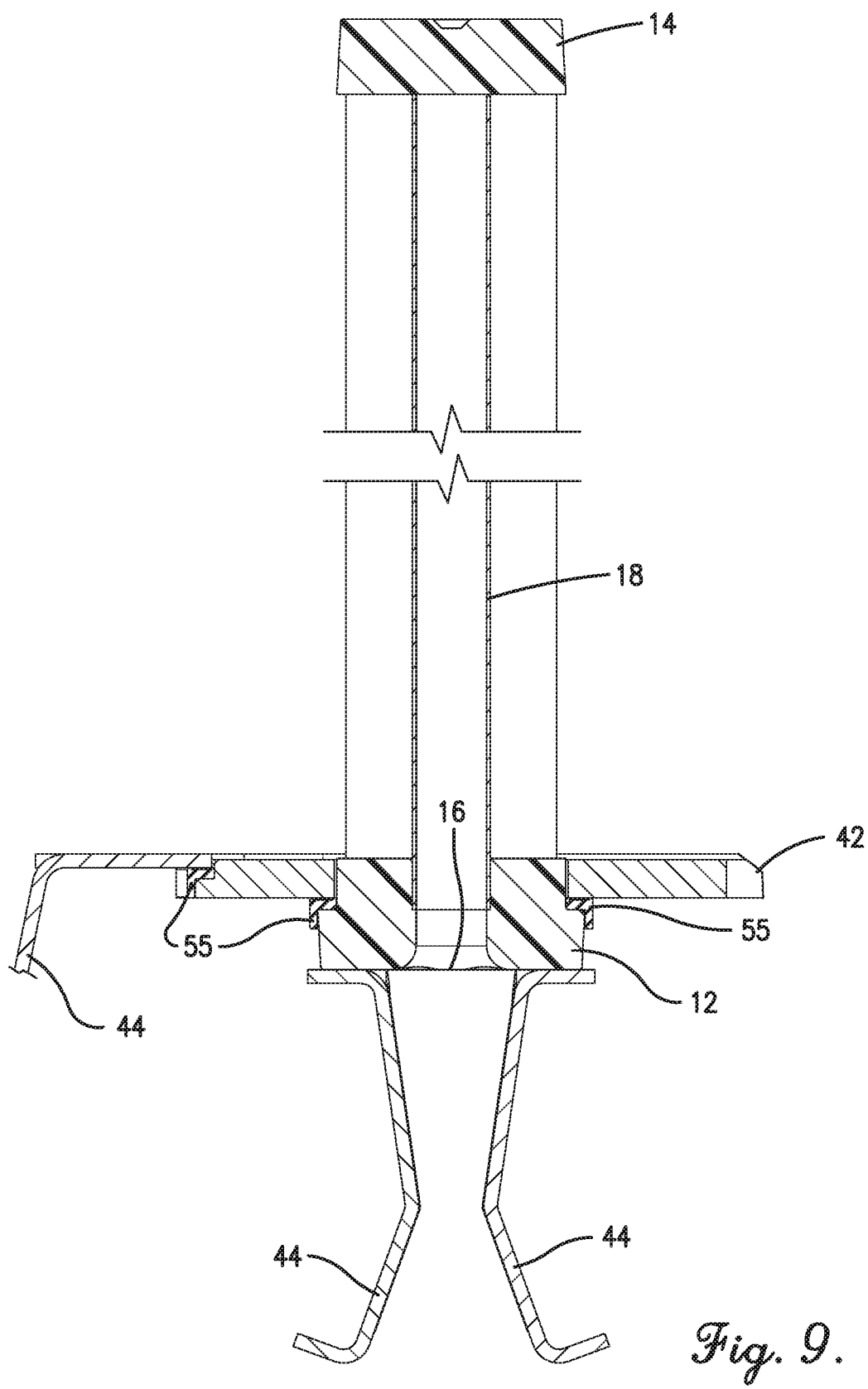
FIG. 9 is a cross-sectional view of the tube sheet and filter cartridge taken along line 9-9 of FIG. 7.
Figure 10:
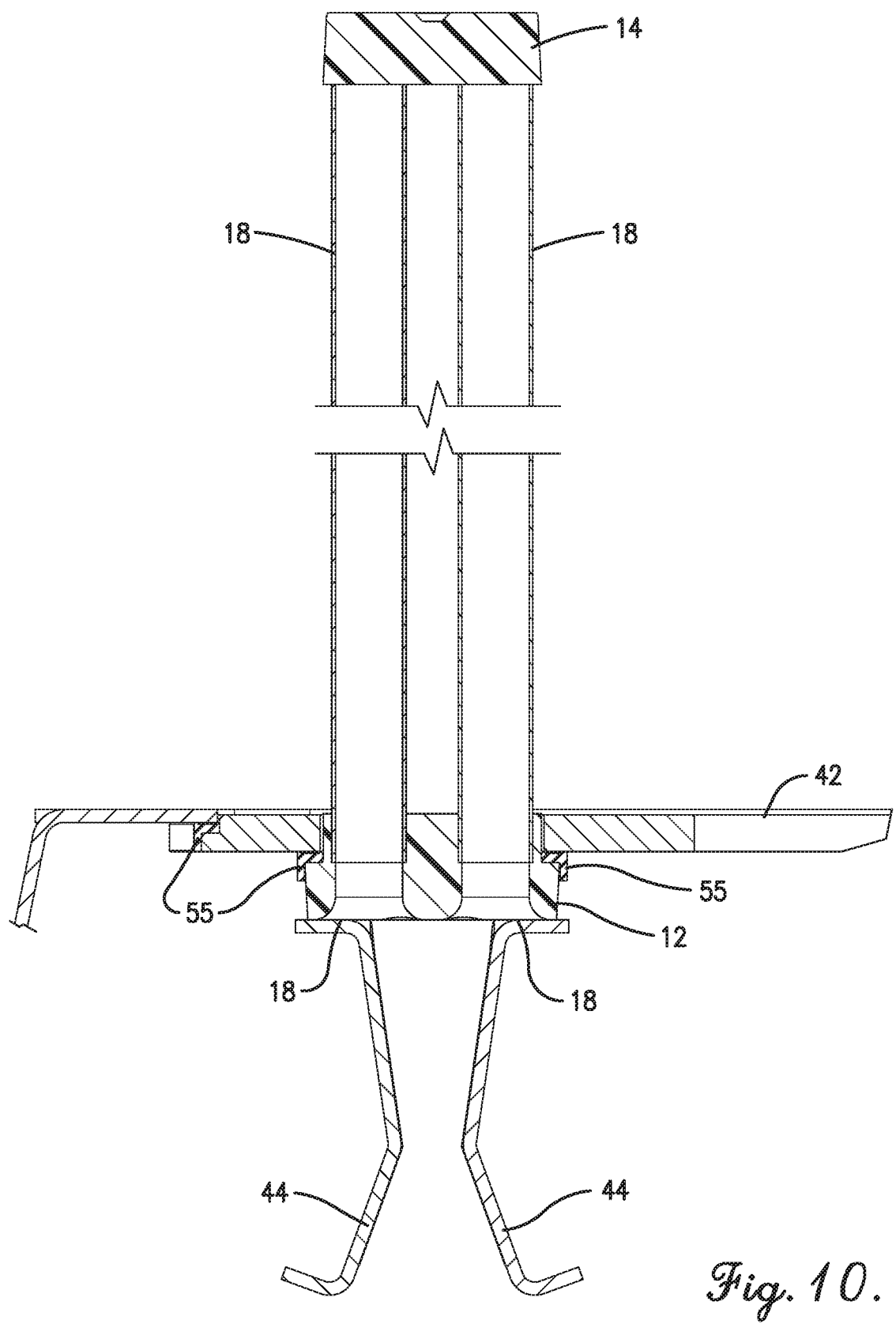
FIG. 10 is a cross-sectional view of the tube sheet and filter cartridge taken along line 10-10 of FIG. 7.

FIGS. 7-10 provide various viewpoints of the interface between the first support structure 12 of the filter cartridge 10 and the tube sheet 42. FIG. 7 also depicts the apertures 52 for the securement mechanism 46 and the support bolts 54 for the housing access door 24. FIGS. 8-10 provide close-up views of the interface between the apertures 16 and the tubular-shaped filter members 18 of the filter cartridge 10 with the tube sheet 42. More particularly, FIGS. 8-10 show how the first support structure 12 abuts against the tube sheet 42, thereby positioning the apertures 16 and the tubular-shaped filter members 18 next to the tube sheet 42. FIGS. 9 and 10 also depict the use of a gasket 55 for further sealing the connection between the first support structure 12 of the filter cartridge 10 and the tube sheet 42.

FIGS. 11 and 12 depict closer views of the apertures 16 within the first support structure 12 of the filter cartridge 10. As shown in FIGS. 11 and 12, each aperture 16 comprises: (i) a front section 56 positioned at the front side of the first support structure 12 that is defined by a maximum inner diameter (D2) 58 of the aperture 16, ii) a rear section 60 configured to support an individual tubular-shaped filter member 18, and (iii) a constricted section 62 positioned between the front section and the rear section and that is defined by a constricted inner diameter (D1) 64. In various embodiments, the front section 56 may comprise a cross-sectional area that is greater than the cross-sectional area of the constricted section 62. Likewise, in various embodiments, the maximum inner diameter 58 of the front section 56 is greater than the constricted inner diameter 64 of the constricted section 62.

Although not depicted in FIG. 12, in various embodiments, the rear section 60 and the constricted section 62 may have the same diameters and cross-sectional areas. In such embodiments, the rear section 60 may be an extension of the constricted section 62 and pertains to the portion of the constricted section 62 on which the tubular-shaped filter member 18 is attached. In this configuration, the rear section 60 refers to the portion of the constricted section 62 that is covered by the tubular-shaped filter member 18.

Although not wishing to be bound by theory, it is believed that the configuration of the larger front section 56 and the constricted section 62 within the apertures 16 helps facilitate the Venturi effect within the filter cartridge 10. Consequently, this constricted configuration within the aperture 16 may allow the present filter cartridges 10 to operate at lower pressure drops and flow velocities compared to other filter cartridges used in the industry.

The front section 56 of the apertures may also be defined by their radii of curvature. For instance, in various embodiments, each of the apertures 16 may have a radius of curvature of at least 0.1, 0.15, 0.2, 0.25, or 0.3 inches and/or less than 1, 0.9, 0.8, 0.7, 0.6, 0.55, 0.5, 0.45, 0.4, or 0.35 inches. Likewise, in various embodiments, each of the apertures 16 may have a maximum diameter (D2) 58 of at least 0.5, 0.6, 0.7, 0.8, 0.9, 1, 1.1, 1.2, 1.3, 1.4, or 1.5 inches and/or less than 10, 5, 4, 3, 2.5, 2, 1.9, 1.8, 1.7, or 1.6 inches.

The preferred forms of the invention described above are to be used as illustration only, and should not be used in a limiting sense to interpret the scope of the present invention.

Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A filter cartridge for a dust collection system, said filter cartridge comprising:
   (a) a first support structure comprising a plurality of apertures;
   (b) a second support structure; and
   (c) a plurality of tubular-shaped filter members disposed between said first support structure and said second support structure, wherein said tubular-shaped filter members are in fluid communication with said apertures, each of said tubular-shaped filter members having an inner diameter,
   wherein each of said apertures comprises a front section positioned at a front side of said first support structure, a rear section configured to support an individual tubular-shaped member, and a constricted section disposed between said front section and said rear section and abutting the individual tubular-shaped filter member, the front section having a first diameter and the constricted section having a second diameter,
   wherein each of said apertures tapers from the first diameter of the front section to the second diameter of the constricted section, the second diameter being equal to the internal diameter of one of the plurality of tubular-shaped filter members.

2. The filter cartridge according to claim 1, wherein said rear section has a third diameter, each of said tubular-shaped filter members having an outer diameter equal to the third diameter.

3. The filter cartridge according to claim 1, wherein said apertures comprise a radius of curvature of 0.1 to 0.9 inches.

4. The filter cartridge according to claim 1, wherein said filter cartridge comprises a ratio of said tubular-shaped filter members to said apertures of 1:1 and said first support structure comprises a staggered formation of said apertures.

5. The filter cartridge according to claim 4, wherein said staggered formation comprises a first vertical column of apertures, a second vertical column of apertures, and a third vertical column of apertures, wherein said first vertical column of apertures and said second vertical column of apertures are parallel to one another and said third vertical column of apertures is offset from said first vertical column of apertures and said second vertical column of apertures.

6. The filter cartridge according to claim 1, wherein said apertures have a maximum opening diameter of 0.2 to 4 inches.

7. A dust collection system comprising:
   (a) a housing comprising at least one sidewall;
   (b) a tube sheet mounted within said housing and comprising one or more receptacles; and
   (c) at least one horizontally-installed filter cartridge at least partially positioned in said receptacles and that extends horizontally towards said sidewall, wherein said filter cartridge comprises
      (i) a first support structure comprising a plurality of apertures;
      (ii) a second support structure; and
      (iii) a plurality of tubular-shaped filter members disposed between said first support structure and said second support structure, wherein said tubular-shaped filter members are in fluid communication with said apertures, each of said tubular-shaped filter members having an inner diameter,
   wherein each of said apertures comprises a front section positioned at a front side of said first support structure, a rear section configured to support an individual tubular-shaped member, and a constricted section disposed between said front section and said rear section and abutting the individual tubular-shaped filter member, the front section having a first diameter and the constricted section having a second diameter,
   wherein each of said apertures tapers from the first diameter of the front section to the second diameter of the constricted section, the second diameter being equal to the internal diameter of one of the plurality of tubular-shaped filter members.

8. The dust collection system according to claim 7, wherein said first support structure has a front side and a back side, wherein:
   (i) said front section comprises a front-sectional area;
   (ii) said rear section comprises a rear cross-sectional area; and (iii) said constricted section comprises a constricted cross-sectional area, wherein said front-sectional area is greater than said constricted cross-sectional area and said rear cross-sectional area.

9. The dust collection system according to claim 7, wherein said filter cartridge comprises a ratio of said tubular-shaped filter members to said apertures of 1:1 and said first support structure comprises a staggered formation of said apertures.

10. The dust collection system according to claim 9, wherein said staggered formation comprises a first vertical column of apertures, a second vertical column of apertures, and a third vertical column of apertures, wherein said first vertical column of apertures and said second vertical column of apertures are parallel to one another and said third vertical column of apertures is offset from said first vertical column of apertures and said second vertical column of apertures.

11. The dust collection system according to claim 7, wherein said apertures comprise a radius of curvature of 0.1 to 0.9 inches.

12. The dust collection system according to claim 7, wherein said apertures have a maximum opening diameter of 0.2 to 4 inches.

13. A method for filtering gas, said method comprising:
   (a) introducing a gas stream comprising particulates into a dust collection system;
   (b) passing said gas stream through at least one horizontally-installed filter cartridge positioned within said dust collection system to remove at least a portion of said particulates from said gas stream and thereby form a filtered gas stream, wherein said filter cartridge comprises
      (i) a first support structure comprising a plurality of apertures;
      (ii) a second support structure; and
      (iii) a plurality of tubular-shaped filter members disposed between said first support structure and said second support structure, wherein said tubular-shaped filter members are in fluid communication with said apertures, each of said tubular-shaped filter members having an inner diameter,
      wherein each of said apertures comprises a front section positioned at a front side of said first support structure, a rear section configured to support an individual tubular-shaped member, and a constricted section disposed between said front section and said rear section and abutting the individual tubular-shaped filter member, the front section having a first diameter and the constricted section having a second diameter,
      wherein each of said apertures tapers from the first diameter of the front section to the second diameter of the constricted section, the second diameter being equal to the internal diameter of one of the of the plurality of tubular-shaped filter members; and
   (c) removing said filtered gas stream from said dust collection system.

14. The method according to claim 13, wherein said first support structure has having a front side and a back side, wherein:
   (i) said front section comprises a front-sectional area;
   (ii) said rear section comprises a rear cross-sectional area; and
   (iii) said constricted section comprises a constricted cross-sectional area,
   wherein said front-sectional area is greater than said constricted cross-sectional area and said rear cross-sectional area.

15. The method according to claim 13, wherein said filter cartridge comprises a ratio of said tubular-shaped filter members to said apertures of 1:1.

16. The method according to claim 13, wherein said first support structure comprises a staggered formation of said apertures, wherein said staggered formation comprises a first vertical column of apertures, a second vertical column of apertures, and a third vertical column of apertures, wherein said first vertical column of apertures and said second vertical column of apertures are parallel to one another and said third vertical column of apertures is offset from said first vertical column of apertures and said second vertical column of apertures.

17. The method according to claim 13, wherein said apertures comprise a radius of curvature of 0.1 to 0.9 inches.

18. The filter cartridge according to claim 1, wherein said first support structure and said second support structure comprise a longitudinal shape in the form a rectangular shape with a pair of semicircles.

19. The dust collection system according to claim 7, wherein said dust collection system comprises a plurality of filter cartridges.

20. The method according to claim 13, wherein said passing comprises passing said gas stream through a plurality of horizontally-installed filter cartridges positioned within said dust collection system.

* * * * *